E. C. Boyle,
Water Wheel.
No. 112,412. Patented Mar. 7, 1871.

Witnesses:
Fred. Haynes
Ferd. Knoch

Ellery C. Boyle

United States Patent Office.

ELLERY C. BOYLES, OF NEW YORK, N. Y.

Letters Patent No. 112,412, dated March 7, 1871.

---

IMPROVEMENT IN WATER-WHEELS.

---

The Schedule referred to in these Letters Patent and making part of the same.

---

*To all whom it may concern:*

Be it known that I, ELLERY C. BOYLES, of the city, county, and State of New York, have invented a new and useful Improvement in Water-Wheels, of which the following is a full, clear, and exact description, reference being had to the accompanying drawing forming part of this specification, and in which—

Figure 1:
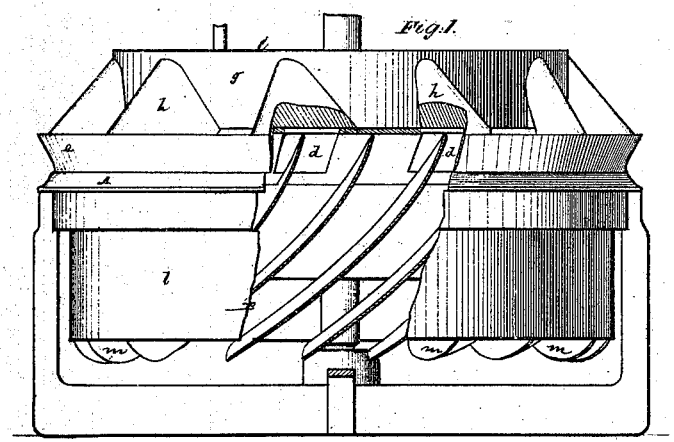
Figure 2:
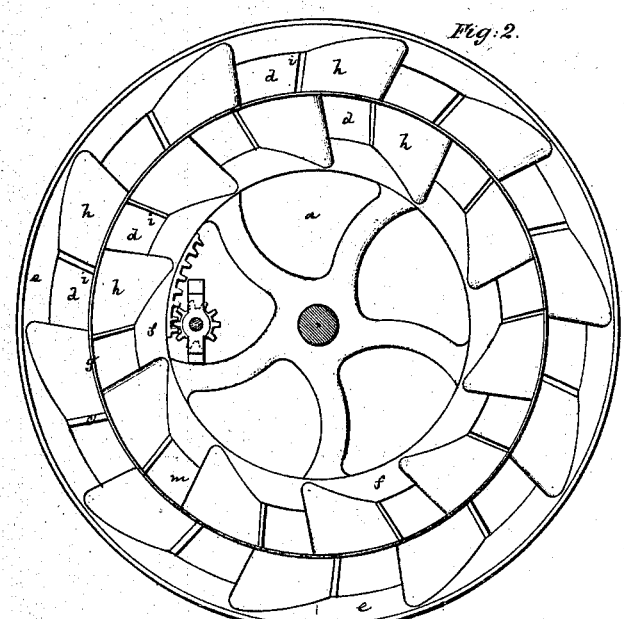

Figure 1 represents a side view of a water-wheel constructed in accordance with my invention;

Figure 2, a plan of the same; and

Figure 3:
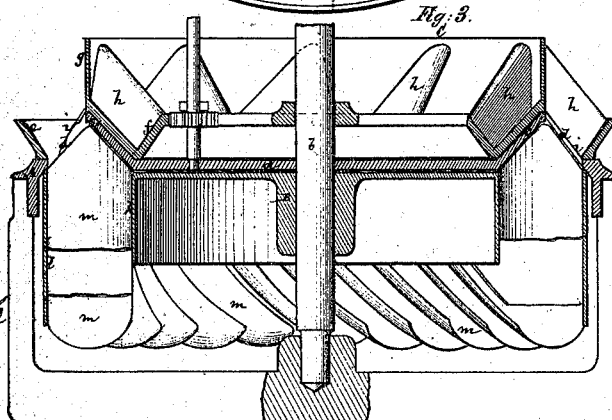

Figure 3, a vertical section thereof.

Suitable letters of reference indicate corresponding parts.

My invention relates to turbine water-wheels, and consists in a novel construction of the gate, case, and buckets of the wheel, whereby the water is received onto the buckets in opposite lateral directions and obliquely in forward and downward courses, and is discharged centrally, outwardly, and downwardly therefrom.

Referring to the accompanying drawing—

A represents the case, beneath and within which the wheel B revolves on an annular gate, C, that fits on and over the case being opened for the purpose.

Said case A is composed for the most part of a center plate, $a$, down through which the shaft $b$ of the wheel passes, and a raised outer hollow rim, $c$, having a transverse section of an inverted V, or other equivalent shape, within and below which the buckets of the wheel travel.

This raised outer hollow rim $c$ is provided on its reversely-sloping sides with obliquely-formed openings $d$, for passage of the water through them onto the wheel, said openings being alternately arranged as regards the two sloping sides of the rim.

The gate C is of an inverse form to the rim $c$, and is fitted over or rests upon the latter, and is constructed with outer and inner beveling, peripherical sides $e$ $f$, and a central vertical flange or rim, $g$, which is connected with the sides $e$ and $f$ by forwardly-inclined chutes $h$ arranged alternately, as regards the opposite sides of the vertical flange, so as to form alternately-arranged openings $i$, corresponding in number with the openings $d$ in the case, over which, when the gate is opened by turning, they lie, but are out of communication with when the gate is closed, the bases of the chutes $h$ then covering the openings $d$. In this way the water is admitted to and its supply regulated or shut off from the wheel.

Any suitable means may be used for turning the gate, a curved rack and pinion, as shown in the drawing, however, answering every purpose.

The chutes $h$, it may be observed, are constructed to direct the water not only downwardly and forwardly, but laterally in reverse directions toward the centers of the buckets.

The wheel B is composed for the most part of an open center and of inner and outer rims $k$ and $l$, with the buckets $m$ in between them.

These rims extend downward in line, or thereabout, with the lower edges of the hollow rim $c$ of the case, and to unequal depths, the outer rim $l$ being made deeper than the inner rim $k$.

The buckets $m$, which correspond in number to the opening $d$ and $i$ in the case and gate, are of a hollow form, and sit inclining upwardly in a forward direction; also, are made pointed at their upper ends, conforming to the shape of the hollow rim $c$, within which they travel, and are preferably constructed to extend below the outer rim $l$ of the wheel.

The gate C being opened the water is conducted, by the chutes $h$ and openings $d$ and $i$, to strike or press upon the buckets, both forwardly, downwardly, and in reverse lateral directions toward the centers of them, giving a most efficient action, and is discharged from the buckets not only downwardly and outwardly, but also centrally, thus relieving the wheel of dead water.

What is here claimed, and desired to be secured by Letters Patent, is—

1. The case A, constructed with a raised outer hollow rim, $c$, having a transverse section of an inverted V or similar shape, with alternately-disposed openings or passage-ways $d$, for the water through the opposite sides of said rim, substantially as specified.

2. The annular gate C, of an inverted V or similar shape in its transverse section between its peripherical rims $e$ and $f$, and provided on opposite sides, between said rims, with alternately-arranged openings $i$ and alternately-disposed chutes $h$, constructed to direct the water downwardly, forwardly, and in reverse lateral directions, essentially as herein set forth.

3. The hollow buckets $m$, set to incline upwardly in a forward direction, and made pointed at their upper ends, in combination with the raised hollow rim of the case A, essentially as described.

ELLERY C. BOYLES.

Witnesses:
FRED. HAYNES,
FERD. TUSCH.